United States Patent [19]
Grills et al.

[11] Patent Number: 4,955,091
[45] Date of Patent: Sep. 11, 1990

[54] METHOD AND APPARATUS FOR A VACUUM ASSISTED TOILET SYSTEM

[75] Inventors: Lawrence M. Grills, Viejo; Eugene F. Colditz, Huntington Beach, both of Calif.

[73] Assignee: Kaiser Aerospace and Electronics Corporation, Foster City, Calif.

[21] Appl. No.: 231,445

[22] Filed: Aug. 12, 1988

[51] Int. Cl.$^5$ .............................................. E03D 1/00
[52] U.S. Cl. ...................................................... 4/321
[58] Field of Search ............................ 4/316, 321, 323

[56] References Cited

U.S. PATENT DOCUMENTS

| | | |
|---|---|---|
| 1,613,848 | 1/1927 | Riegel . |
| 1,613,849 | 1/1927 | Riegel . |
| 1,619,369 | 3/1927 | Riegel . |
| 3,922,730 | 12/1975 | Kemper ................................. 4/10 |
| 4,063,315 | 12/1977 | Carolan ................................. 4/10 |
| 4,164,049 | 8/1979 | Michael ................................. 4/300 |
| 4,242,765 | 1/1981 | Russell ................................. 4/321 |
| 4,275,470 | 6/1981 | Badger et al. ........................ 4/316 |
| 4,376,314 | 3/1984 | Iwans . |
| 4,385,912 | 5/1983 | Parrick et al. ...................... 55/329 |
| 4,521,925 | 6/1985 | Chen et al. . |

OTHER PUBLICATIONS

Evac Vacuum Toilet Systems: Envirovac Inc., CPR. 1987.

Primary Examiner—Charles E. Phillips
Attorney, Agent, or Firm—Marvin H. Kleinberg

[57] ABSTRACT

A non recirculating, low volume toilet system for aircraft includes a interim storage tank connected to the toilet bowl. A waste drain leads to a gate valve which opens to a vacuum assisted luid gas separator. The separator is connected to the main waste tank. In a first embodiment, the main waste tank is a non pressurizable vessel and is maintained within a pressurized portion of the aircraft. The separator is alternatively connected to the exterior environment and the pressurized interior. When the toilet is utilized, the flushing operation uses a very small amount of flushing fluid to clean the bowl and transfer the contents to the interim tank. Opening the gate valve subjects the bowl and the interim tank to a pressure differential which transfers the flushing liquid and waste matter to the separator. The gate valve is closed and the separator is permitted to reach pressure equilibrium with the main waste tank at which time the contents of the separator are transferred to the main waste tank. A partial vacuum is again drawn in the separator, awaiting the next flush operation. In an alternative embodiment, the main waste tank can be a pressure vessel in the pressurized portion of the aircraft and can be maintained at the exterior pressure. In this embodiment, the separator is then maintained at the same pressure as the main waste tank at all times.

9 Claims, 2 Drawing Sheets

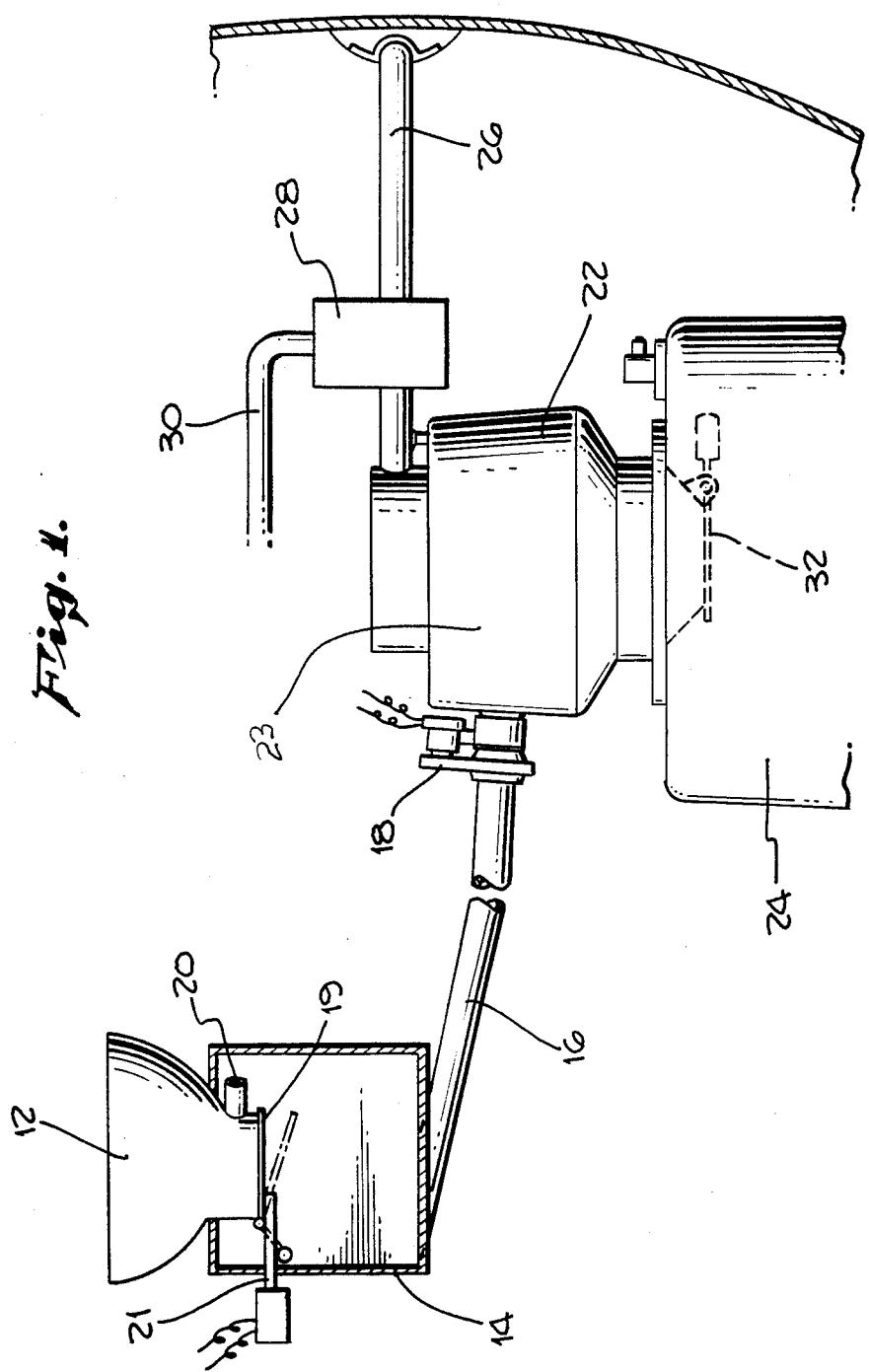

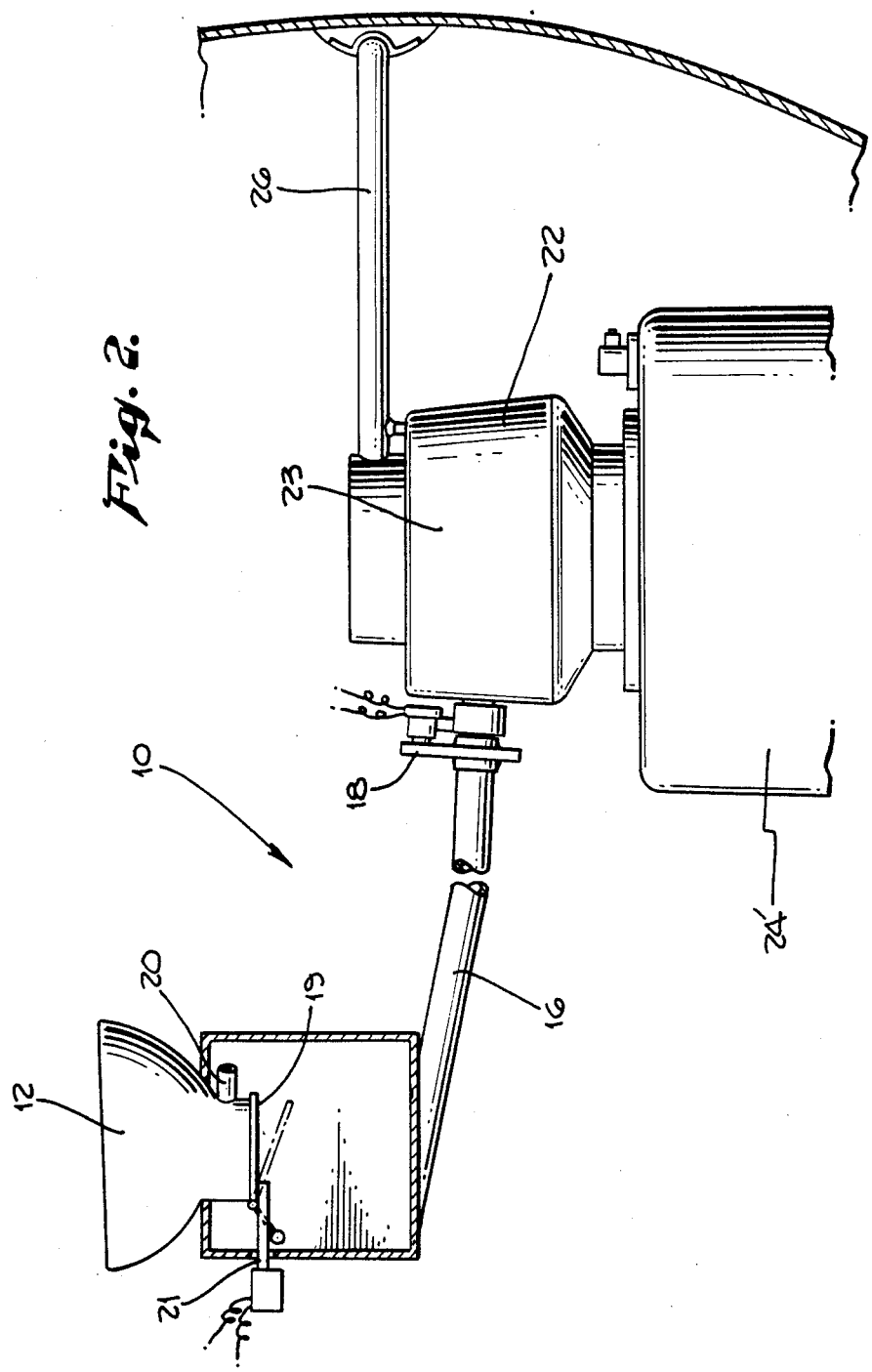

METHOD AND APPARATUS FOR A VACUUM ASSISTED TOILET SYSTEM

BACKGROUND OF THE INVENTION

The present invention relates to self-contained toilet systems, and, more particularly, to self-contained, vacuum-assisted toilet systems for use in vehicles in general and aircraft, in particular.

Self-contained toilet systems have been utilized in vehicles for many years and are currently in use in aircraft, buses and trains, as well as in recreational vehicles of all sorts. For many years, recirculating systems have been widely accepted because, among other things, they did not require extensive stores of flushing fluid and did not require that substantial amounts of flushing fluid be retained with the waste products.

Vacuum-assisted toilet systems have been described in references as early as 1895. A series of patents issued to S.S Riegel from applications filed April 28, 1925, U.S. Pat. Nos. 1,613,848; 1,613,849; and 1,619,369. These patents described a self contained, vacuum assisted toilet system for a railway passenger car. The system utilized a bowl, a compressed air ejection system for transferring the waste from the bowl to a waste tank in which a partial vacuum was maintained, either through the use of an exhaust fan or through the use of a compressed air system which operated on the principal of an aspirator.

In more recent years, James M. Kemper described a vacuum assisted recirculating toilet for use in aircraft in U.S. Pat. No. 3,922,730, which issued Dec. 2, 1975. A plurality of individual recirculating toilet units were commonly connected to a waste tank which was vented to the exterior of the aircraft through a pressure regulator. The fluid in the tank was withdrawn by a pumping system for flushing purposes. However, each toilet, when operated, transported its waste matter through conduits under the influence of a partial vacuum in the waste tank.

A comparable system was disclosed in the patent to Raymond J. Carolan, U.S. Pat. No. 4,063,315, issued Dec. 20, 1977. Carolan provided a blower unit to provide the partial vacuum when the aircraft was on the ground or at altitudes insufficient to provide the partial vacuum required for efficient operation of the system. This system, too, was a recirculating system which withdrew fluid from the waste tank to be used as flushing fluid.

In order to avoid the problems that are associated with recirculating toilet systems, including the aesthetic questions that arise from the repeated use of recirculated waste fluids, several systems have been proposed which utilize the fresh or potable water supply of the vehicle. Because such a system requires that the water thus used be stored while the vehicle is in transit, it is desirable to minimize the volume of water that is to be used at each operation of the toilet system. The other constraint, of course, is the limited amount of potable water that can be carried between servicing stops of the vehicle.

One such system was shown in the patent to Badger et al, No. 4,275,470, which issued June 30, 1981. That system employed a holding tank which was maintained at a vacuum. As the toilet was used, a fresh water source supplied a limited volume (eight ounces) of water to flush the toilet. A flush valve is opened and a pressure differential is created between the toilet bowl and the holding tank sufficient to propel the waste to the tank. For operation when the pressure external to the vehicle is not sufficiently low to create and adequate differential, a vacuum blower is employed to assist in creating the desired differential.

A similar system was disclosed by Iwans in U.S. Pat. No. 4,376,314, issued Mar. 15, 1984. Iwans taught a toilet that could be sealed from the surrounding environment and which provided an air manifold in addition to the flushing fluid source so that a combination of high velocity air and water could be used to flush the waste products into a conduit to the waste tank, which is maintained at a vacuum. This system also utilizes approximately eight ounces of water for each flush operation.

An aircraft system employing a plurality of toilets feeding into a common holding tank was disclosed by Chen et al in U.S. Pat. No. 4,521,925, issued June 11, 1985. In that patent, the holding tank was maintained at a vacuum, either by communication with the exterior of the vehicle while at altitude or through the use of a vacuum blower when the external environment does not provide a sufficient pressure differential. A specially designed bowl and manifold structure introduces the water in a plurality of streams which permit the efficient use of approximately eight ounces of fresh water for each flush operation. A liquid separator is provided so that entrained air can be vented to the exterior while preventing the flow of moisture.

Systems of the prior art such as those taught in the above mentioned patents require that the main storage tanks be sufficiently strong to withstand the pressure differential that exists between the interior and exterior of the tank inasmuch as the tanks are usually located within the pressurized portion of the aircraft. This generally requires a pressure vessel which usually takes on a spherical or cylindrical shape with hemispherical ends. These shapes must be placed in an otherwise unobstructed volume of the aircraft hull.

Further, if the toilet system is to be available to passengers while the aircraft is on the ground, the vacuum blower system must be energized to evacuate the tank, each time a toilet is flushed. This may require that the blower system be continuously in operation during any period that the aircraft is on the ground and occupied by passengers.

A water saving commode patented by Joyce A. Russell on Jan. 6, 1981, U.S. Pat. No. 4,242,765, disclosed a device intended for domestic use that included an interim holding tank that, when sufficient wastes had accumulated, dumped the wastes into a sewer line. Adapting the Russell system to a vehicle, such as an aircraft, provides a flexibility of use that enables operation under conditions where a vacuum is not readily available.

It would be desirable, to have a nonrecirculating, vacuum assisted toilet system that was sufficiently simple and otherwise inexpensive and which could utilize a waste tank that could be fitted anywhere within the pressurized volume of the aircraft. If a pressure vessel is not required, the tank may have an irregular shape, permitting installation in any location having sufficient available volume.

In an alternative embodiment, a system that did require a pressure resistant waste storage tank could be provided. It would also be desirable to have a system that could function while the aircraft was on the ground and yet did not require the creation of a vacuum throughout the system each time the toilet was used.

SUMMARY OF INVENTION

According to a preferred embodiment of the present invention, a nonrecirculating, vacuum assisted toilet system for vehicles and, especially aircraft, is provided which includes a main waste holding tank that is kept at all times at the same pressure as the interior environment, even though the aircraft cabin would vary between the normal pressures on the ground and the partially pressurized condition usually encountered in flight. In an alternative embodiment, the main waste tank can be maintained at exterior pressure at all times.

Each toilet bowl is connected via a gravity feed line through a toilet shut off valve to a vacuum tank/separator which extracts entrained liquids from any gases that are vented overboard from the vacuum tank/separator. Since the main waste tank is maintained at cabin pressure, a vacuum tank/separator is provided which is alternatively coupled to cabin pressure or the ambient pressure exterior of the aircraft. In the alternative embodiment, the vacuum tank/separator and main waste tank can be vented to the exterior environment at all times.

Each toilet bowl is mounted on a small, interim holding tank that is connected to the vacuum tank/separator through a waste line that attaches to a shut off valve which is interposed between the small interim holding tank and the vacuum tank/separator. The waste line can provide additional, temporary waste storage and a gravity flow to the main waste tank that assists in the transporting of waste products to the tank. On the ground, gravity is the primary cause of the flow. At altitude, a vacuum assist becomes the primary cause of waste flow to the main tank.

A balanced flapper valve at the exit of the bowl permits the contents of the bowl to be transferred, by gravity, into the interim holding tank and then into the waste line. In an alternative embodiment, a solenoid controlled lock mechanism may hold the flapper valve closed whenever the interim holding tank is coupled to a vacuum, and an alternative waste port, located in a side wall of the bowl is utilized to impart a swirling rotation to the waste material as it enters the interim holding tank.

The waste products accumulate at the interim holding tank preceding the shut off valve until the valve is actuated. The interim holding tank and the waste line, combined, can hold whatever waste products are produced until the aircraft reaches operating altitude. Alternatively, the shut off valve can be operated while on the ground and the accumulated products can enter the main waste tank.

In alternative embodiments, the shut off valve can be adjacent the toilet so long as the interim holding tank is large enough to accommodate the anticipated usage while the aircraft is on the ground. As in the preferred embodiments, the shut off valve can be operated in the absence of the vacuum assist that is present when the aircraft is at altitude, but it is deemed preferable to operate the shut off valve only when the vacuum assist can be employed.

While on the ground, in alternative embodiments, a pressure differential may be created by several, well known approaches. In the absence of the gravity feed, a water ejector, for example, which would require approximately two gallons of water to transfer the contents of the holding tank, which can be supplied from the aircraft potable water supply or could come from a ground based source of water, when available. A ground based drain system should be employed to carry away the excess water to prevent premature filling of the main waste tank.

Since, in the preferred embodiment, the interim holding tank has a capacity of approximately three gallons, if each usage of the toilet provides approximately eight ounces of waste products and eight ounces of flushing fluid, the interim holding tank's contents need to be transferred to the main waste tank after approximately twenty four uses. In the ground mode of operation, therefore, as noted above, the shut off valve need not operate each time the toilet is flushed. It may be opened either by a cabin attendant operating a control, or, by a counter or a level sensor which can start a transfer, automatically.

It may be assumed that the frequency of usage of a toilet while the aircraft is on the ground is once each six minutes or ten times per hour. However, the ground time of an aircraft that is occupied by passengers is generally less than two hours. Accordingly, in most instances, the capacity of the interim holding tank and waste line would be adequate for use while on the ground. When the aircraft reaches altitude, a pressure sensitive switch can be actuated to set the system for vacuum assisted operation. At the time that the first passenger is permitted to use the toilet, the entire contents of the interim holding tank and waste line will be transferred to the main waste tank, assisted by the low exterior pressure outside the aircraft.

Once in the air and at altitude, the flush cycle includes the furnishing of flushing liquid, which may be potable water from the aircraft fresh water supply, and the operation of the shut off valve to transfer the waste products to the vacuum tank/separator, which is then at exterior atmospheric pressure, substantially below the cabin pressure. A diverter valve connects the vacuum tank/separator to the aircraft exterior. In the alternative embodiment, the main waste tank remains at a pressure that is substantially below that of the cabin and therefore always provides an assist to the flushing operation whenever the shut off valve is opened.

In the preferred embodiment, at the completion of each flush, a diverter valve vents the vacuum tank/separator to cabin pressure, thereby permitting the tank flapper valve to transfer the contents of the settling tank to the main waste tank. Alternatively, the diverter valve may merely block the connection to the exterior and the shut off valve can remain open long enough to bring the settling tank up to a pressure sufficient to permit the waste products in the vacuum tank/separator to drop into the main waste tank.

A timer can determine when to either operate the diverter valve to vent the settling tank to exterior pressure or to close the shut off valve. In either case, in its usual or normal state, the settling tank rapidly reaches equilibrium with the exterior environment. The tank flapper valve is thus maintained in a sealed position so that the main waste tank can remain at cabin pressure. In the alternative embodiment, however, the main waste tank is always at equilibrium with the exterior of the aircraft and can be a pressure vessel.

It is also possible to employ level sensors to signal predetermined quantities in the main waste tank. These level sensors can trigger alarms when the main waste tank is filled to its operating limit. At the same time, the toilets coupled to the "full" tank can be placed "Out of Order" to prevent overfilling.

In the preferred embodiment, the main holding tank, since it need not be a pressure vessel, may have an irregular shape, allowing it to occupy virtually any available volume within the pressurized areas of the aircraft hull.

BRIEF DESCRIPTION OF THE DRAWING

Further advantages and features of the present invention will be more fully apparent to those skilled in the art to which the invention pertains from the ensuing detailed description thereof, regarded in conjunction with the accompanying drawings wherein like reference numerals refer to like parts throughout and in which:

FIG. 1 is a side, partially sectional view of a preferred embodiment of the vacuum assisted toilet system of the present invention, and FIG. 2 is a side, partially sectional view of an alternative embodiment of the vacuum assisted toilet system of the present invention.

DETAILED DESCRIPTION OF THE INVENTION

Turning first to FIG. 1, there is shown a preferred embodiment of the vacuum assisted toilet system 10 of the present invention. A toilet bowl 12 is mounted on a small, interim holding tank 14 that communicates with a waste drain line 16 through a toilet shut off valve 18 that is mounted near a side wall of the tank 14. A counterbalanced toilet flapper valve 19 normally isolates the bowl 12 from the interim holding tank 14 and its contents. A diverter nozzle 20 is provided at the side wall of the bowl, which communicates with the interim holding tank 14.

In non vacuum operation, the weight of any waste products deposited in the bowl 12, together with any flushing liquid, is sufficient to tilt the toilet flapper valve 19 so that the bowl's contents can be transferred to the interim holding tank 14. At vacuum conditions, a solenoid controlled flapper valve lock 21 holds the flapper valve 19 closed so that the contents exit the bowl 12 through the diverter nozzle 20 and the waste matter enters the interim holding tank 14 tangentially to the interim holding tank wall. This imparts a high velocity, Coriolis type flow to the materials entering the interim holding tank 14 which then circulate before exiting, thereby reducing the amount of contaminants that might remain in the tank 14.

The waste drain line 16 can be separated vertically from the toilet shut off valve 18 so that any waste products entering the waste drain line 16 from the interim holding tank 14 will be transported by gravity to the normally closed toilet shut off valve 18. The toilet shut off valve 18, is, in the preferred embodiment, a motorized valve similar to that described and shown in the Letters Patent of Frederick W. Perez, No. 4,693,447, issued Sept. 15, 1987, entitled MOTORIZED GATE VALVE FOR A WASTE DISPOSAL SYSTEM, and assigned to the assignee of the present invention.

Inasmuch as the concept of utilizing the supply of onboard potable water as a flushing fluid has been advanced by others, the details of the flushing operation have been omitted, it being understood that those skilled in the art will be fully cognizant of structures adequate to mechanize the principle. Moreover, the details of the logic system for coordinating the flushing action with the operation of the toilet shut off valve 18 have not been set forth, except in connection with the description of the operation of the system.

The toilet shut off valve 18 opens into a tangentially located entry port of a vacuum tank/separator 22 which includes a water separator 23 that permits air, which may be entrained with liquid wastes, to be recovered for venting overboard during vacuum assisted operation of the system. The wastes enter with some velocity and are caused to circulate annularly. As velocity is lost, the liquid and solid waste products are directed into a main waste tank 24, which is, in the preferred embodiment, adapted to be in the ambient environment within the vehicle.

During flight, the interior of the main waste tank 24 is maintained at the cabin pressure, which is the environment of the toilet bowl 12. A vent line 26 communicates with the exterior of the aircraft and communicates with the vacuum tank 22 through a diverter valve 28. A cabin vent line 30 is also connected to the diverter valve 28.

The vacuum tank 22 can then be alternatively vented, through the diverter valve 28, to the cabin pressure or to the pressure existing outside the aircraft. Normally, the diverter valve 28 couples the vacuum tank/separator 22 to the exterior through the vent line 26.

The vacuum tank/separator 22 is provided with a flapper dump valve 32 which isolates the main waste tank 24 from the interior of the vacuum tank/separator 22 whenever a pressure differential exists between the vacuum tank/separator 22 interior and the main waste tank 24 (which is normally at cabin pressure). If there are waste products within the vacuum tank/separator 22, whenever the vacuum tank/separator 22 is at pressure equilibrium with the cabin and the main waste tank 24, those waste products will fall into the main waste tank 24.

The operation of the toilet system 10 may be considered in two phases: the flight phase, during which the aircraft cabin must be pressurized and at which time there exists a substantial pressure differential between the cabin and the ambient environment exterior to the aircraft; and the "ground" phase, during which there is substantially no pressure differential between the cabin and the ambient environment exterior to the aircraft.

Treating first the "ground" phase, the main waste tank 24 and the cabin are at pressure equilibrium. This phase covers the period when the aircraft is on the ground or, if airborne, not yet at an altitude where a substantial pressure differential exists. During the ground phase, any usage of the toilet results in waste products, including the flushing fluid, being deposited in the interim holding tank 14 from the bowl 12. Under gravity, the contents of the interim holding tank 14 can flow into the waste drain line 16 and rest at the toilet shut off valve 18.

If there is substantial usage of the toilet 12 during the ground phase, the waste drain line 16 may fill and some of the waste products may be retained in the interim holding tank 14. If necessary, provision can be a made for manual or automatic operation of the toilet shut off valve 18 to prevent the interim holding tank 14 from becoming too full. Alternatively, the valve 18 may be held open while the aircraft is on the ground. It is contemplated that the capacity of the interim holding tank 14 and the waste drain line 16 is sufficient to accommodate all anticipated usages of the toilet system 10 during the ground phase.

During the flight phase, the diverter valve 28 maintains the vacuum tank/separator 22 at the lower pressure of the environment so that the toilet shut off valve 18, when opened, normally creates the pressure differential in the path between the bowl 12 and the vacuum tank/separator 22. After the toilet shut off valve 18 has opened and the waste products have been transported to the vacuum tank/separator 22, the diverter valve 28 may operate to block the path through the vent line 26 to the exterior and open the second path through cabin vent line 30 to the pressurized environment of the cabin.

With the vacuum tank/separator 22 at pressure equilibrium with the cabin and the main waste tank 24, the weight of the accumulated wastes in the vacuum tank/separator 22 is sufficient to open the flapper dump valve 32, in the absence of a pressure differential tending to keep the flapper dump valve 32 sealed. After a brief timed interval, sufficient for the vacuum tank/separator 22 to dump its contents into the main waste tank 24, the diverter valve 28 again connects the vacuum tank/separator 22 to the exterior environment, creating a pressure differential between the vacuum tank/separator 22 and both the main waste tank 24 and the toilet bowl 12, which are at cabin pressure.

In the alternative embodiment, illustrated in FIG. 2, the main waste tank 24' must be structurally reinforced so that it may be permanently vented to the exterior of the aircraft. In this embodiment, the diverter valve of the preferred embodiment is unnecessary inasmuch as both the vacuum tank/separator 22 and the main waste tank 24' are maintained at the pressure of the environment exterior to the aircraft.

In operation during the ground phase, the preferred and alternative embodiments operate substantially in identical fashion. In both embodiments, the cabin and aircraft exterior are at substantially the same pressure.

During the flight phase, however, the main waste tank 24' may be considered to be a vacuum "source" because of the continuous venting of the tank 24' to the exterior of the aircraft. If the toilet bowl 12 is utilized during this phase, the toilet shut off valve 18 is preferably made to operate contemporaneously with the operation of the flush control. If the toilet shut off valve 18 opens after the contents of the bowl 12 have been deposited in the interim holding tank 14, the operation is less satisfactory since the "swirling" of the waste material exiting the bowl 12 into the interim holding tank 14 helps to transfer all of the waste material to the main tank 24'.

Opening the toilet shut off valve 18 creates the pressure differential between the toilet bowl 12 and the main waste tank 24'. Under the force of this pressure differential, the relatively higher cabin pressure propels the contents of the interim holding tank 14 through the diverter nozzle 20 around the interior of the interim holding tank 14 and into the waste drain line 16 to the vacuum tank/separator 22 and then into the main waste tank 24'. After a predetermined time interval, the shut off valve 18 closes, isolating the holding tank 14 from the main waste tank 24'.

The pressure differential provides a much greater propulsive force on the waste products than does gravity and has the additional, beneficial effect of drawing all odors and the like out of the lavatory area. Moreover, because the evacuation of the line is so rapid under the force of the pressure differential, the normal operating cycle of the toilet shut off valve 18, as described and shown in the above mentioned Lopez patent, is more than adequate to completely drain the waste line 16 and the interim holding tank 14 after each usage of the toilet bowl 12.

Thus there has been shown is alternative embodiments, a new, vacuum assisted waste disposal system which can be employed on passenger aircraft. In a preferred embodiment, the main waste tank is maintained at cabin pressure. A vacuum tank is alternatively connected to cabin pressure or the exterior environment through a diverter valve.

When at operating altitude, the vacuum tank is normally maintained at the lower pressure of the exterior environment. If the toilet is flushed, the toilet shut off valve is opened and the vacuum tank provides the vacuum necessary to assist the evacuation of the toilet and main waste drain line.

The diverter valve then connects the vacuum tank to cabin pressure. When the vacuum tank reaches pressure equilibrium with the cabin, a tank flapper valve, which is normally held shut when a pressure differential exists between the main waste tank and the vacuum tank, is free to open so that the contents of the vacuum tank are deposited in the main waste tank. After a brief interval, the diverter valve then reconnects the vacuum tank to the exterior environment.

The system can be provided with level sensors to signal the condition of the main waste tank and, if necessary, disable the toilets to prevent overfilling of the main waste tank. The individual toilet modules can also be provided with interim holding tanks to permit usage when a vacuum assist is not available.

In an alternative embodiment, the main waste tank is maintained at the pressure of the exterior environment. While on the ground, gravity flow transports any waste products from the toilet to the waste drain line, much in the same fashion as in the preferred embodiment. In both embodiments, it may be desirable to hold the toilet shut off valve open so that all waste products proceed directly to the main waste tank. However, the capacity of the drain line and the toilet assembly may be adequate for interim waste storage while the aircraft is on the ground.

When the aircraft is at altitude and toilet usage is permitted, the main waste tank is at the same pressure as the exterior environment. After any usage of the toilet, the toilet is flushed and the toilet shut off valve is opened which provides a substantial vacuum assist to the gravity flow, propelling the waste materials to the main waste tank.

Other modifications and variations within the scope of the present invention will become apparent to those skilled in the art. Accordingly, scope of the invention should be limited only by the scope of the claims appended hereto.

What is claimed as new is:

1. A vacuum assisted, non-recirculating toilet system adapted for use with a source of flushing liquid comprising in combination:
   (a) a bowl for receiving waste matter wherein said bowl has a curved interior surface and includes:
      (i) a first exit port at the bottom of said bowl;
      (ii) a gravity operated flapper valve coupling said bowl to said interim holding tank;
      (iii) locking means for disabling said flapper valve in the closed position;
      (iv) a second exit port adjacent said first exit port but extending substantially tangentially to said curved interior surface for introducing waste matter into said interim holding tank with tangential velocity when assisted by a vacuum;
(b) an interim holding tank coupled to said bowl for temporarily storing flushed waste matter;
(c) vacuum assisted separator means;
(d) waste drain means coupling said interim holding tank to said separator means for conveying waste matter thereto;
(e) a main waste tank coupled to said separator means and adapted to receive waste matter therefrom whenever said waste tank and said separator means are at pressure equilibrium;
(f) pressure resistant shut off valve means interposed in said waste drain means between said interim holding tank and said separator means;
(g) flushing means coupled to the source of flushing liquid for applying a predetermined limited amount of flushing liquid to said bowl for transferring any waste matter to said interim holding tank; and
(h) means adapted to be connected to the external environment for creating a partial vacuum in said separator means whenever the exterior environmental air pressure is substantially lower than the air pressure in the vicinity of said bowl,
whereby opening said shut off valve means permits waste matter accumulated in said waste drain means and said interim holding tank to flow therethrough under a pressure differential from said holding tank to said separator means, and whereby said locking means are employed whenever a vacuum assist is used to transfer waste matter form said bowl so that the waste matter acquires sufficient velocity to resist dispersion in directions lateral to the direction of flow.

2. Apparatus as in claim 1, above, wherein said bowl is located in a pressurized cabin of an aircraft.

3. Apparatus as in claim 1, above, wherein said separator means are located within the pressurized portion of an aircraft.

4. Apparatus as in claim 3, above wherein said separator means are maintained alternatively at the pressure of the aircraft interior and the pressure exterior to the aircraft.

5. Apparatus as in claim 1, above, including means for alternatively communicating said separating means with the ambient environment exterior to the system and to the environment in the vicinity of said bowl.

6. A vacuum assisted, non-recirculating toilet system adapted to be connected to a source of flushing liquid and to main storage tank means maintained at the pressure of the environment of the toilet system, comprising in combination:
(a) a bowl for receiving waste matter said bowl having a curved interior surface and including:
(i) a first exit port at the bottom of said bowl;
(ii) a gravity operated flapper valve coupling said bowl to said interim holding tank;
(iii) locking means for disabling said flapper valve in the closed position;
(iv) a second exit port adjacent said first exit port but extending substantially tangentially to said curved interior surface for introducing waste matter into said interim holding tank with tangential velocity when assisted by a vacuum,
(b) an interim holding tank coupled to said bowl for temporarily storing flushed waste matter;
(c) vacuum assisted settling tank means coupled to the main storage tank means;
(d) waste drain means coupling said interim holding tank to said settling tank means for conveying waste matter thereto;
(d) shut off valve means interposed in said waste drain means between said interim holding tank and said settling tank means for maintaining a fluid and pressure tight seal therebetween;
(f) flushing means coupled to the source of flushing liquid for applying a predetermined limited amount of flushing liquid to said bowl for transferring any waste matter to said interim holding tank; and
(g) means for alternatively creating a partial vacuum in said settling tank means when the pressure exterior to the toilet system is less than the pressure of the environment of the toilet system, and permitting said settling tank means to reach the pressure of the environment of the toilet system and the main waste tank means,
whereby opening said shut off valve means permits waste matter to flow therethrough under a pressure differential from said holding tank to said settling tank means, the main storage tank receiving the contents of said settling tank means whenever the pressure within said settling tank means approximates the pressure in the storage tank means, and whereby said locking means are employed whenever a vacuum assist is used to transfer waste matter from said bowl so that the waste matter acquires sufficient circumferential velocity to resist dispersion in directions other than the direction of flow.

7. Apparatus as in claim 6, above, wherein said bowl is located in a pressurized cabin of an aircraft.

8. Apparatus as in claim 7, above wherein said separator means are maintained alternatively at the pressure of the aircraft interior and the pressure exterior to the aircraft.

9. Apparatus as in claim 6, above, wherein said separator means are located within the pressurized portion of an aircraft.

* * * * *